Jan. 15, 1935.   R. B. M. BENNETT   1,987,599
STEERING WHEEL PROTECTOR
Filed July 1, 1933
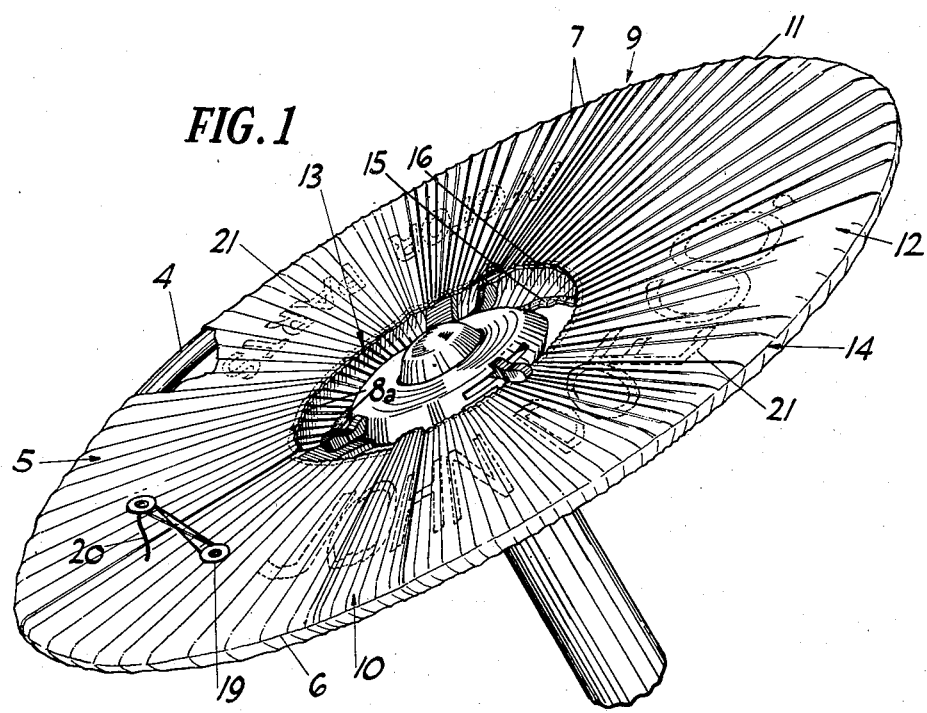
FIG.1
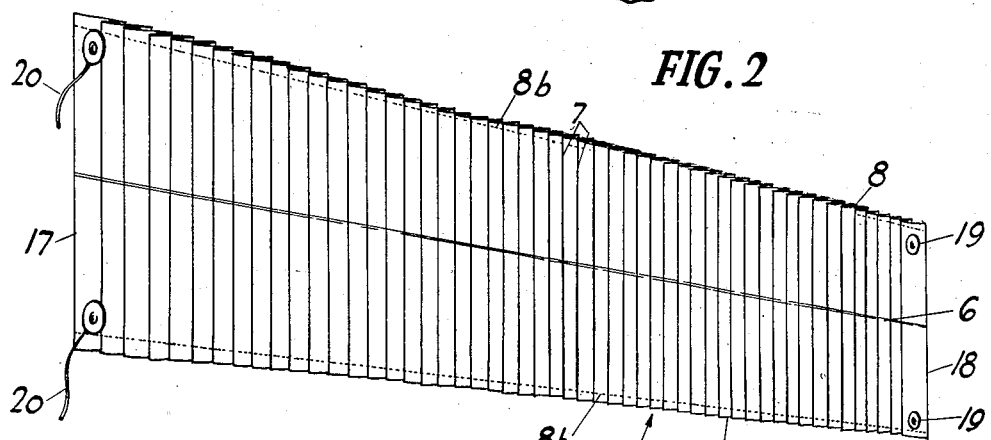
FIG.2
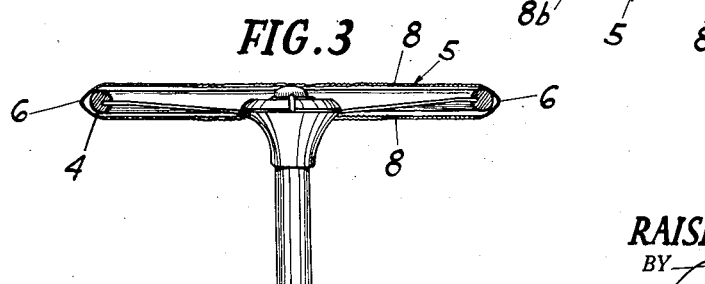
FIG.3
INVENTOR.
RAISLEY B. M. BENNETT
BY
ATTORNEY Patented Jan. 15, 1935

1,987,599

UNITED STATES PATENT OFFICE 1,987,599

STEERING WHEEL PROTECTOR

Raisley B. M. Bennett, La Jolla, Calif.

Application July 1, 1933, Serial No. 678,638

8 Claims. (Cl. 150—52)

This invention relates to a sanitary steering wheel cover or protector.

When a motor vehicle is to be serviced, it is the custom among the most up-to-date garages and repair shops to send a mechanic who picks up the car and later returns it when the work thereon has been completed.

The steering wheel is the first and last part of the car which is used in this servicing performance. It is impossible for automobile mechanics to keep their hands clean due to the handling of oily and greasy parts, the removing of carbon, and their contact with the grimy parts in general that are enclosed beneath the hood of a car.

Hence, although the best of soaps and cleaners may be provided for the help, the oil works into the pores of the workman's skin and, due to his perspiring while gripping the hand-wheel of a car while driving, secretes and deposits a film or objectionable coating thereon.

Therefore it will be obvious that a protector for a steering wheel is quite necessary to ward off such an event as for example the possible discoloring of the gloves of a lady who may be embarking in a hurried manner. This could easily happen and the mechanic be quite unaware of the occurrence. It is on such an occasion as this that a good and valued customer is lost.

It is an important object of the invention to supply the urgent need of an improved article which will overcome this disadvantage and insure to a customer that it is the desire on the part of the servicer to keep all parts clean and sanitary so far as is in his power to do this. Coupled with this assurance is the important feature that the throught of cleanliness will be impressed upon the mind of the customer, and will be promoted and rendered permanent by the advertising matter, which will be prominently and conspicuously displayed on the face of the protector.

A still further object is to improve upon my former invention, the application for which was patented September 26, 1933, #1,927,913, and especially to amplify and carry forward an important alternative species disclosed in said application.

Yet still another object of the invention is to provide a temporary cover for a steering wheel while the car is parked at the beach or outside during foggy or inclement weather, to prevent the moisture from collecting thereon.

These protective covers are constructed with a view to being used once only and then discarded without compunction, either by the workman or the customer, preferably by the latter, for it is the purpose, as stated supra, to use the advertising feature to advantage.

These objects and features, with the disclosure of others, will be better understood when reference is made to the accompanying drawing showing the following figures.

Fig. 1 is a perspective view showing the improved cover or protector applied to the steering wheel portion of an automobile.

Fig. 2 is a perspective view showing the device in its normal position. In this view the hem is slightly modified from that shown in Fig. 1 and Fig. 3 is a mid-sectional view, on a somewhat reduced scale, showing the device illustrated in Fig. 2 applied to a steering wheel.

Referring in detail to the drawing, the steering wheel protector provided as an embodiment of the invention is applied to the steering wheel 4, and consists of an elongated rectangular pleated sheet of material 5, preferably constructed of relatively pliable material such as paper. It is provided with a crease or break line 6 extending lengthwise of the device at the mid-center thereof.

The sheet of material before it is pleated, lapped, or folded may be of a size approximately 60" long and 11" wide. The pleats 7 are preferably spaced uniformly and constructed approximately ⅛" in width and are all preferably lapped in the same direction, as best seen by looking along the top side edge in Fig. 2. In the latter view it will be noted the edge of the top pleat is approximately opposite to the edge of the bottom pleat. That is to say, the folds which form the pleats are sufficiently wide to cause the pleats substantially to meet each other and thus normally provide three overlying thicknesses of sheet material. Said pleats extend transversely of the sheet and the side edges 8 are stitched by stitchings 8b as shown in Fig. 2; or rolled and stitched as indicated by 8a in Fig. 1. The particular mode and kind of fastening of these side edges per se is not intended to be a patentable distinction.

Steering wheels, on the various classes of cars, vary somewhat in their size and construction. In order to equip the various types of existing steering wheels with what may be termed a standard protector, I construct the pleated sheet so as to accommodate the largest size of wheel.

When it is desired to use the protector on a smaller size wheel, some of the pleats are left in their pleated or lapped position. In order to typify this interchangeability or use of the protector I purposely show in Fig. 1 how this arrangement is brought about.

Throughout a space 9 on the periphery of the rim and within a space 10 almost diametrically opposite, I show a lapped or pleated condition of the sheet, while within an area 11 I show a medium stretch, and at a space 12, I show a fully outstretched condition of the sheet.

Owing to the fact that the lines of stitches 8b are almost inelastic, and to the further fact that the sheet material of which the device is composed possesses considerable elasticity or stretchability, the extensibility of the mid-width portion of the device with relation to its edge portions depends not only upon the presence of pleats or folds, but upon the inelasticity of the stitching as compared to the elasticity or stretchability of the sheet material. The elasticity of the sheet material depends not alone upon its pleats, but also upon the pebbled, creased or crimpled character thereof.

When the original sheet of material is pleated the folds are constructed so as to contract the length of the sheet ⅔. This would mean that the circumference along line 13 on the largest size wheel would be about 20", while along a line 14 the sheet would be elongatable circumferentially to a distance of some 60".

The crease line 6 is intended to show the line at which the protector is normally applied to the wheel, and also to afford a break line from which the side edges 8 subtend and arcuately flex transversely toward the axis of the steering wheel to form two circles 15 and 16 of lesser diameter than that which is realized at the crease line or rim of the wheel.

The protector may be applied to the wheel in several manners the following one of which is given. Grasp the ends 17 and 18 of the device and apply the central portion to the highest or crest point of the wheel, bending the protector along the crease line. The hands may be then employed to stroke the protector to the right and left around the perimeter of the wheel. As the mid-width of the device is caused to elongate, it assumes a circular form. This is due to the constricting means or the stitched edges which retain the pleated condition.

Simultaneously with the stroking toward the right and left, the crease of the pleats are directed radially inward both above and below the wheel, thereby enclosing it as shown in Fig. 3.

The ends 17 and 18 may be caused to overlap so that the pleat on one end will telescope with a pleat on the other end, but in order to keep the ends from sagging and to cause them always to present a neat appearance when installed, I employ corner fasteners 19 on one end which are engageable with corner fasteners 20 on the other end.

When the protector is thus installed the advertising matter 21, in the face of the protector, will be prominently brought into view.

I claim:

1. A protector for steering wheels, comprising an elongated sheet of material having a series of folds extending transversely thereof and the side edges of the folded sheet being folded over and secured to the sheet and the end portions of said folds, to keep the end portions of the folds from unfolding.

2. A steering wheel protector comprising an elongated sheet of relatively pliable material having a series of relatively narrow pleats extending athwartwise thereof, said pleats being of such a character that they form three overlying thicknesses throughout all parts of the non-extended sheet, and means to secure the outer edges of the folds in their folded relation.

3. A steering wheel protector comprising an elongated sheet of relatively stretchable material having a series of relatively narrow pleats extending athwartwise thereof, said pleats being of such a character that they form three overlying thicknesses, and means to secure the outer edges of the folds in their folded relation, there being a crease extending lengthwise of the folded sheet at the mid-width thereof to facilitate the application of the protector to the wheel during installing.

4. A steering wheel cover of flexible sheet material having pleats extending transversely of the sheet and stitched hems at the side edges thereof, there being a crease line extending from end to end of the sheet when pleated, said sheet upon application to a steering wheel being elongatable along said crease line and the side edges of said sheet being adapted to flex toward the axis of the steering wheel to form two circles of lesser diameter than that along said crease line and thereby enclose and house a steering wheel, and means to secure the free ends of said sheet together.

5. In a device of the kind described, an elongated sheet of material having transversely extending pleats combined with crimps or creases, said pleats cooperating with said crimps or creases to add to the extensibility of the sheet along its mid-width, the side edge portions of said sheet being provided with means to restrict their extensibility, and means to secure the end portions of said sheet to each other.

6. A steering wheel cover applicable circumferentially of the wheel, comprising a pleated sheet of relatively stretchable crepe paper, said sheet having a crease line extending lengthwise along the mid-width of said pleated sheet whereby along the side portions of the sheet may be flexed, said side portions providing space for advertising display, the side edges of said pleated sheet being provided with a hem and stitching along said hem providing constricting means, whereby, when said pleated sheet is flexed along said crease line and said sheet is elongated circumferentially along said crease line, the side portions of the sheet flex arcuately to provide an enclosure for the rim of a steering wheel, and cooperative fasteners for the end portions of said sheet.

7. As an article of manufacture, a steering wheel cover comprising an elongated sheet of relatively stretchable material having a series of spaced pleats extending transversely thereof, there being a flexure line extending from end to end along the mid-width thereof, constricting means at the side edges of said sheet whereby it is rendered non-expandible therealong without affecting its expansibility along its mid-width, the edge constricting means, when the device is being made operative, causing the sides of the sheet on either side of said flexure line to flex arcuately in a transverse direction to form upper and lower circumferences during the circumferential expanding of the sheet intermediate them, and cooperative fasteners for engaging the free ends of the sheet together.

8. A cover for steering wheels comprising an elongated sheet of paper provided with a series of pleats which extend thereacross, the edge of each pleat on one side of the sheet being approximately opposite to the reverse edge of an adjacent pleat on the reverse side of the sheet, whereby a triple extensibility is afforded to the sheet along its mid-width, and means extending along each long edge of the sheet to keep the end portions of the pleats from unfolding.

RAISLEY B. M. BENNETT.